United States Patent
Huth et al.

(10) Patent No.: US 12,355,610 B2
(45) Date of Patent: Jul. 8, 2025

(54) COMPUTER-IMPLEMENTED METHOD FOR MAINTAINING A FUNCTION IN LOCAL ENTITIES UPON CONNECTION DISRUPTION TO A BACKEND IN A COMMUNICATION SYSTEM

(71) Applicant: Robert Bosch GmbH, Stuttgart (DE)

(72) Inventors: Christopher Huth, Heilbronn (DE); Arne Nordmann, Stuttgart (DE); Martin Ring, Lossburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/179,528

(22) Filed: Mar. 7, 2023

(65) Prior Publication Data

US 2023/0370323 A1 Nov. 16, 2023

(30) Foreign Application Priority Data

May 10, 2022 (DE) ..................... 10 2022 204 556.4

(51) Int. Cl.
*H04L 41/0631* (2022.01)
*H04L 41/14* (2022.01)
*H04L 67/145* (2022.01)

(52) U.S. Cl.
CPC ........ *H04L 41/0631* (2013.01); *H04L 41/145* (2013.01); *H04L 67/145* (2013.01)

(58) Field of Classification Search
CPC .. H04L 41/0631; H04L 41/145; H04L 67/145
See application file for complete search history.

(56) References Cited

U.S. PATENT DOCUMENTS

| | | | |
|---|---|---|---|
| 10,033,847 B2 * | 7/2018 | Osman | H04W 76/00 |
| 2017/0271984 A1 * | 9/2017 | Kohn | H02J 7/0063 |
| 2019/0258251 A1 * | 8/2019 | Ditty | G06N 3/063 |
| 2021/0113921 A1 * | 4/2021 | Musbah | A63F 13/422 |
| 2022/0126864 A1 * | 4/2022 | Moustafa | G08G 1/096758 |
| 2022/0201584 A1 * | 6/2022 | Piriou | H04W 36/08 |
| 2023/0177349 A1 * | 6/2023 | Balakrishnan | G06N 3/08 706/25 |
| 2024/0045851 A1 * | 2/2024 | Li | H04L 67/1097 |

\* cited by examiner

*Primary Examiner* — Christopher B Robinson
*Assistant Examiner* — Angela Widhalm De Rodriguez
(74) *Attorney, Agent, or Firm* — NORTON ROSE FULBRIGHT US LLP

(57) ABSTRACT

A computer-implemented method for maintaining a function of a local entity upon connection disruption to a backend in a communication system including a backend and a plurality of local entities. The backend provides backend information for the function. The method includes reception of local behavior models from a plurality of local entities by the backend, wherein the local behavior models provide the function in the local entities if particular backend information is not available; creation of a behavior model based on the received local behavior models; and transmission of the behavior model to a local entity of the plurality of the local entities by the backend.

13 Claims, 3 Drawing Sheets

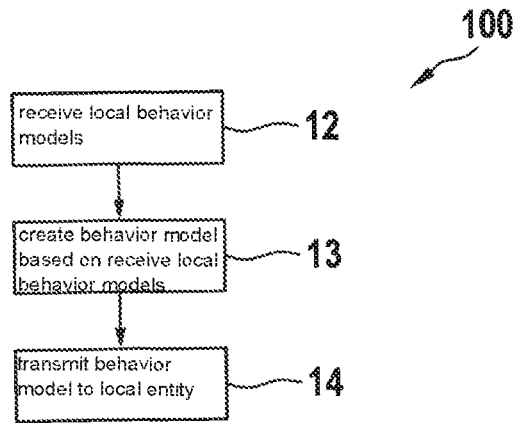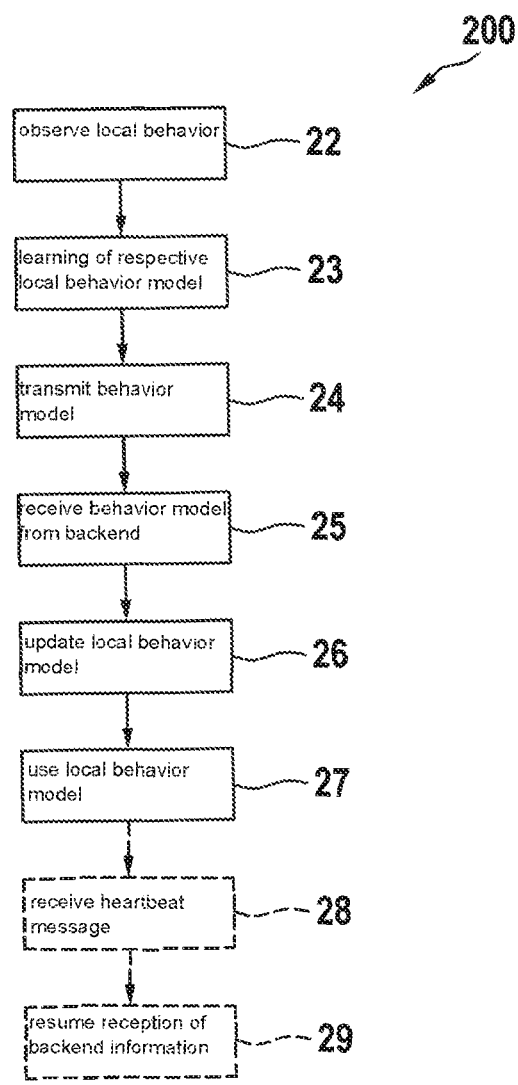

COMPUTER-IMPLEMENTED METHOD FOR MAINTAINING A FUNCTION IN LOCAL ENTITIES UPON CONNECTION DISRUPTION TO A BACKEND IN A COMMUNICATION SYSTEM

CROSS REFERENCE

The present application claims the benefit under 35 U.S.C. § 119 of German Patent Application No. DE 10 2022 204 556.4 filed on May 10, 2022, which is expressly incorporated herein by reference in its entirety.

FIELD

Many software systems are based on the principle of the layer structure, wherein a higher layer is able to access a lower layer. An example of a two-layer architecture is the client-server system. Here, the server may be referred to as a backend, which provides resources to the client, which may be referred to as the frontend. Here, the frontend is the local entity closer to the user and the backend is the more remote system. Through a multi-layer construction, local resources (hardware and software) can be saved at the frontend, if for example, the backend serves to store large amounts of data or carry out complex computational operations, which can then be retrieved by the frontend. Problems may arise if communication from a local entity to a backend is disrupted or has completely failed and the backend can no longer provide local entities with the necessary services or data required for local functions. This may result in undesirable function failure. Examples of backend-frontend communication with possible connection disruptions can inter alia be found in mobile telephony, mobile robotics, the Internet of Things or mobility. Particular attention has recently been paid to the development of autonomous and/or assisted driving methods. Here, there is a risk of a connection disruptions, for example, if a vehicle is in a region with poor network coverage or due to traffic infrastructure conditions, such as tunnels or underpasses. It may happen that some on-board systems representing local entities are no longer able to communicate with the backend and thus do not obtain necessary data or information, which may result in malfunctions in the vehicle, or particular functions no longer being available to the user. Examples of this can be current traffic information for route planning or traffic jam avoidance or information about the charging network in the area of electric mobility. Good system design must take into account the unavailability of base services and information from the backend, which can generally be associated with a noticeably worse user experience. There is thus a need for a possibility of maintaining functionality in case of connection disruption to a backend. The aforementioned examples are not limiting but rather serve to illustrate the problems presented.

SUMMARY

A first general aspect of the present invention relates to a computer-implemented method for maintaining a function in local entities upon connection disruption to a backend in a communication system comprising a backend and a plurality of local entities, wherein the backend provides backend information for the function. According to an example embodiment of the present invention, the method comprises reception of local behavior models from a plurality of local entities by the backend, wherein the local behavior models in the local entities provide the function if particular backend information is not available. The method further comprises creation of a behavior model based on the received local behavior models. The method further comprises transmission of the behavior model to a local entity of the plurality of local entities by the backend.

A second general aspect of the present invention relates to a computer-implemented method for maintaining a function in local entities upon connection disruption to a backend in a communication system comprising a backend and a plurality of local entities, wherein the backend provides backend information for the function. According to an example embodiment of the present invention, the method comprises observation of its local behavior by a local entity of the plurality of local entities. The method further comprises learning of its local behavior model by the local entity. The method further comprises transmission of the local behavior model to the backend by the local entity. The method further comprises reception of a behavior model from the backend by the local entity and updating of the local behavior model by the local entity based on the behavior model received from the backend. The method further comprises use of the local behavior model of the local entity to provide the function if particular backend information is not available.

A third general aspect of the present invention relates to a computer system designed to perform the computer-implemented method for maintaining a function in local entities upon connection disruption to a backend in a communication system according to the first and/or second general aspect (or an embodiment thereof) of the present invention.

A fourth general aspect of the present invention relates to a computer system designed to perform the computer-implemented method for maintaining a function in local entities upon connection disruption to a backend in a communication system according to the first and/or second general aspect (or an embodiment thereof) of the present invention.

A fifth general aspect of the present invention relates to a computer-readable medium or signal, which stores and/or contains the computer program according to the fourth general aspect (or an embodiment thereof) of the present invention.

The methods of the present invention according to the first general aspect (or an embodiment thereof) or according to the second general aspect (or one embodiment thereof) can enable the maintenance of a function in local entities upon connection disruption to a backend in a communication system. An advantage may be that, through the methods of the present invention disclosed herein, the dependence of the local entities on the permanent connection to the backend can be reduced and the failure of a function can be avoided. As a result, it is possible that a user does not become aware of the connection disruption and does not suffer any disadvantages. Through the methods of the present invention disclosed herein, a local behavior model may provide the function in the local entity if information from the backend is not available for the function due to a connection disruption. The local behavior model may be learned in the local entity and may be sent to the backend. The backend may obtain behavior models from a plurality of local entities and may create a behavioral model therefrom. By aggregating the behavior models, a higher quality of the model can be achieved and outliers can, for example, be detected. The behavior model can be transmitted back to the local entities by the backend. Each local entity can then update its local behavior model with the received behavior model. In so doing, transmission of the behavior model by the backend and updating of the local behavior model by the local entity at regular intervals and/or if particular events occur, or optionally if a connection between the backend and the local entity is degraded, can lead to the local entity having a high-quality behavior model if a connection disruption occurs. Through this procedure, continuous functionality independent of a disruption of the connection to the backend can be ensured for the user. In the event of a fault, the functionality need not differ from the functionality that is available if a connection to the backend is not disrupted. As a result, user-friendliness and user experience is maintained even if the connection to the backend is disrupted. The user-friendliness and user experience are maintained even in the event of a disruption of the connection to the backend, so that the user does not need to notice a connection disruption.

Some terms are used in the present disclosure in the following manner:

A "local entity" may be a unit, closer to the possible user, for data processing, controlling a downstream device and/or a downstream process, or monitoring the like. The local entity may be in an area with a plurality of local entities. For example, a local entity may be a system in a vehicle, a system in a robot, a system in a machine tool, an industrial machine and/or plant, a single system unit in a larger computing system, or a portable data processing unit (wearable computer).

A "function" may, for example, be a computational operation, a data processing regulation, an instruction to downstream methods, an indication of information to a user or, for example, the control of a fully automated or partially automated process. A function may be offered in a local entity (i.e., the local entity provides the function). A plurality of functions may also be offered in a local entity. A function may in some examples be an autonomous and/or assisted driving function. For example, accelerating a vehicle or displaying drive information (e.g., speed, estimated arrival time) may be a function.

A "backend" may, for example, be a computing unit. A backend may be mobile or stationary, for example. Furthermore, a backend may, for example, comprise a system for storing data or performing computational operations. A backend may also comprise a system for evaluating data and/or a system for creating control targets.

"Backend information" may be pieces of information that are stored and/or processed on a backend and can be provided to a local entity. The information may include location-based information (e.g., location-specific information) or time-based information (e.g., time of day and/or season), as well as information from a larger entity, such as the World Wide Web, such as weather information, traffic information, (road) map information, or any other type of information that may be necessary for a local entity to provide a function.

A "communication system" may be a network for exchanging information in the form of data. The communication system is not limited to any particular technology. For example, the communication system may be a computer network or a local area network (LAN) or, for example, a public or non-public wide area network (WAN).

A "connection disruption" or "a disrupted connection" may be an event or situation in which transmission of data from the local entity to the backend or from the backend to the local entity is only partially possible or is not possible at all (e.g., a complete termination of the connection or a reduction of a service quality of a connection). For example, a connection disruption may occur due to a natural event and/or weather event, due to a region of poor network coverage, due to conditions of the traffic infrastructure, such as tunnels or underpasses, or, for example, also due to failure of technical means such as a transmission module and/or reception module for an information-bearing signal. A connection may be understood as bi-directional. In other words, whether one is speaking of a connection from a local entity to a backend or from a backend to a local entity makes no difference.

A "behavior model" may be a statistical model, for example a hidden Markov model, which provides specific actions for particular situations or indicates probabilities for particular events or states. For example, in a suddenly occurring traffic jam situation, braking a vehicle may be an action derived from the occurring traffic jam situation.

A "vehicle" may be any device that transports passengers and/or freight. A vehicle may be a motor vehicle (for example, a car or a truck) but also a rail vehicle. A vehicle may also be a motorized, non-motorized, and/or muscle-powered bi- or tricycle. However, floating and flying devices may also be vehicles. Vehicles may be at least partially autonomously operating or assisted.

BRIEF DESCRIPTION OF THE DRAWINGS

FIGS. 1A-1B schematically illustrate a computer-implemented method for maintaining a function in local entities upon connection disruption to a backend in a communication system, according to an example embodiment of the present invention.

DETAILED DESCRIPTION OF EXAMPLE EMBODIMENTS

Figure 2:
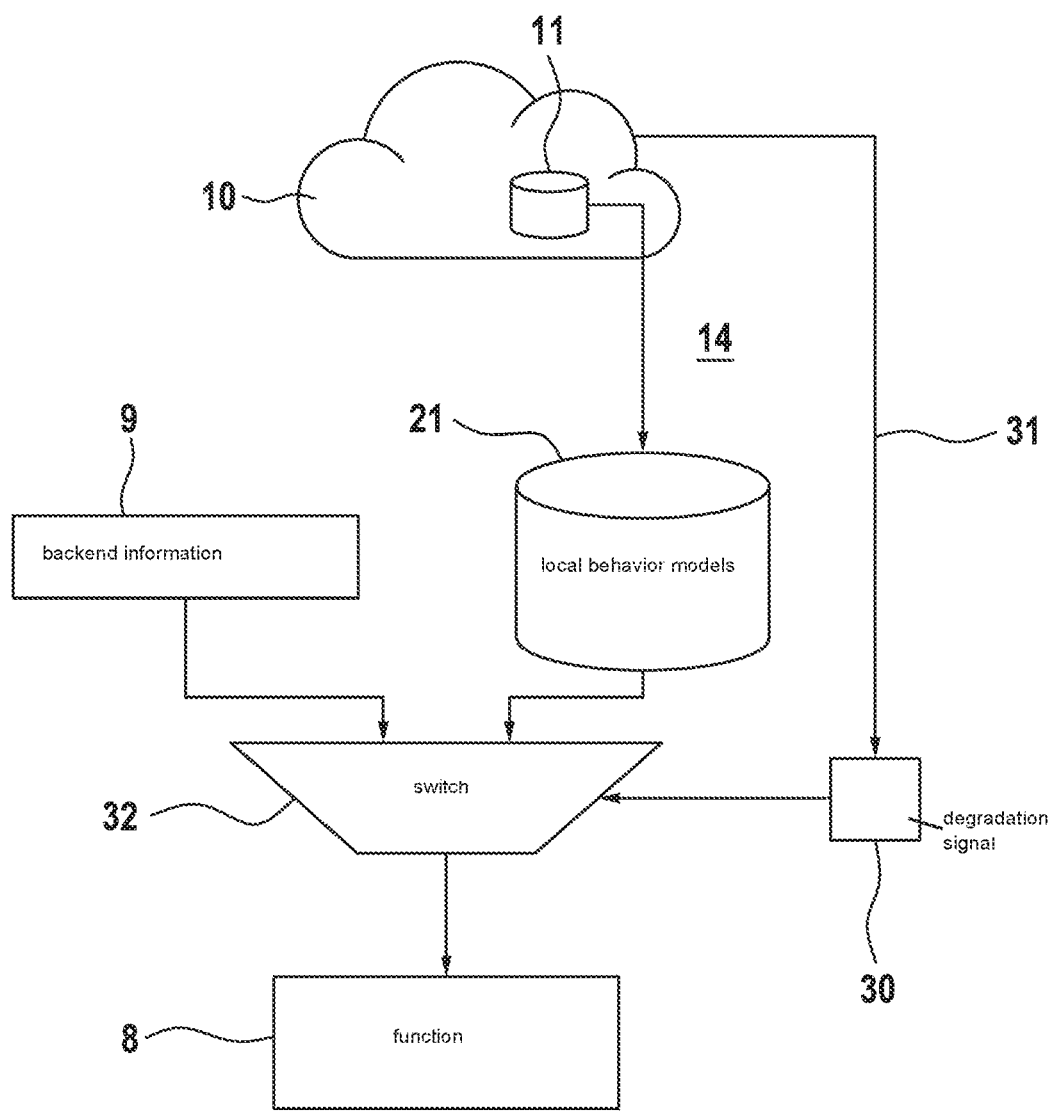
FIG. 2 schematically illustrate a system for executing the computer-implemented method for maintaining a function in local entities upon connection disruption to a backend in a communication system, according to an example embodiment of the present invention.

A computer-implemented method 100 of the present invention is disclosed for maintaining a function 8 in local entities upon connection disruption to a backend 10 in a communication system comprising a backend 10 and a plurality of local entities 20, wherein the backend 10 provides backend information 9 for the function 8. For example, the plurality of local entities 20 may comprise >=1, >=2, >=5, >=10, >=50 or >=100 local entities 20 (e.g., between 3 and 20 local entities). Each of these local entities 20 can be coupled to the backend for information exchange. FIG. 1A shows, by way of example, the computer-implemented method 100.

The method 100 comprises reception 12 of local behavior models 21 from a plurality of local entities 20 by the backend 10, wherein the local behavior models 21 in the local entities 20 provide the function 8 if particular backend information 9 is not available. For example, the plurality of local behavior models 21 may comprise >=1, >=2, >=5, >=10, >=50 or >=100 local behavior models 21. As a result of connection disruptions, individual information, a multiplicity or an entirety of backend information 9 necessary for the function 8 may not be available to the function 8. This could lead to a partial or total failure of the function 8. If the case occurs that particular backend information 9 of the function 8 is not available, the respective local behavior model 21 in a local entity 20 provides the function 8 in order to ensure the function 8 even in the event of a connection disruption. Alternatively, a single local behavior model 21 may also provide a plurality of functions if particular backend information 9 is not available.

The method further comprises the creation 13 of a behavior model 11 based on the received 12 local behavior models 21. The creation may comprise, for example, aggregating or merging the local behavior models, or, for example, creating a new behavior model based on all behavior models 21 received, or alternatively, a portion of the behavior models 21 received. This procedure makes it possible, for example, to identify outlier behavior models.

The method further comprises transmission 14 of the behavior model 11 to a local entity 20 of the plurality of local entities by the backend 10. The transmission 14 is also shown, by way of example, in FIG. 2. The transmission 14 may be to a single local entity 20, some local entities or an entirety of the plurality of local entities. The transmission 14 of the behavior model 11 by the backend 10 may alternatively occur, for example, at regular intervals and/or if particular events occur, optionally upon degradation of a connection between the backend 10 and the local entity 20. Particular events may, for example, include the backend 10 and/or the local entity 20 entering a sleep state or, for example, the need for updating or maintenance of the backend and/or of the local entity 20. Furthermore, any reasons for unavailability of the backend and/or of the local entity 20 may be particular events. Alternatively, the behavior model 11 may be transmitted if a connection disruption is apparent, for example, due to a weakening or decrease in signal strength, or if it is known that the local entity 20 is approaching or already at a region of weaker network coverage, for example, or generally speaking, the local entity 20 may enter a state in which there is a risk of a connection disruption to the backend 10. The reception 12 of the local behavior models 21 and/or the creation 13 of a behavior model 11 may alternatively occur, for example, at regular intervals and/or if particular events arise, optionally upon degradation of a connection between the backend 10 and the local entity 20. Particular events may, for example, include the backend 10 and/or the local entity 20 entering a sleep state or, for example, the need for updating or maintenance of the backend and/or of the local entity 20. Furthermore, any reasons for unavailability of the backend and/or of the local entity 20 may be particular events. Alternatively, the behavior model 11 may be transmitted if a connection disruption is apparent, for example, due to a weakening or decrease in signal strength, or if it is known that the local entity 20 is approaching or already at a region of weaker network coverage, for example, or generally speaking, the local entity 20 may enter a state in which there is a risk of a connection disruption to the backend 10.

Further disclosed is a computer-implemented method 200 for maintaining a function in local entities 20 upon connection disruption to a backend 10 in a communication system comprising a backend 10 and a plurality of local entities 20, wherein the backend 10 provides backend information 9 for the function 8.

FIG. 1B shows the computer-implemented method 200, by way of example. The method 200 comprises observation 22 of its local behavior by a local entity 20 of the plurality of local entities. The observation may occur, for example, through any suitable means of sensor technology (e.g., optical, acoustic, inductive, capacitive and/or tactile measurement systems, e.g., camera-based systems, LIDAR systems, RADAR systems; ultrasonic measurement systems and/or temperature measurement systems), geographic positioning means and/or time measurement means. The observation 22 may comprise capturing environmental information. The observation 22 may comprise any suitable means for data acquisition. The observation may also comprise signal processing, signal preparation, and/or utilization of the signals in the form of data for subsequent method steps. For example, the observation 22 may be a regular operation, a permanent and/or ongoing operation, an irregular and/or event-based operation.

The method 200 further comprises learning 23 of its respective local behavior model 21 by the local entity 20. The learning 23 may, for example, be unsupervised learning, supervised learning, and/or reinforcement learning, for example. Alternatively, the learning 23 may comprise statistical data evaluation. Further alternatively, the learning 23 may comprise any manner of data processing and/or any means of gaining knowledge from data. Alternatively, the learning 23 may also be specific to a region, for example, within the meaning of a geographic region or a particular location, to cover regional differences. For example, the learning 23 may, for example, be a regular operation, a permanent and/or ongoing operation, an irregular and/or event-based operation.

The method 200 further comprises the transmission 24 of the behavior model 21 to the backend 10 by the local entity 20. The transmission 24 may in this case occur at regular intervals and/or if particular events occur, optionally upon degradation of a connection between the backend 10 and the local entity 20. Particular events may, for example, include the backend 10 and/or the local entity 20 entering a sleep state or, for example, the need for updating or maintenance of the backend 10 and/or of the local entity 20. Furthermore, any reasons for unavailability of the backend 10 and/or of the local entity 20 may be particular events. Alternatively, the local behavior model 21 may be transmitted if a connection disruption is apparent, for example, due to a weakening or decrease in signal strength, or if it is known that the local entity 20 is approaching or already in a region of weaker network coverage, for example, or generally speaking, the local entity 20 may enter a state in which there is a risk of a connection disruption to the backend 10.

The method 200 further comprises reception 25 of a behavior model 11 from the backend 10 by the local entity 20 and updating 26 of the local behavior model 21 by the local entity 20 based on the behavior model 11 received from the backend 10. The reception 25 of a behavior model 11 from the backend 10 by the local entity 20 allows the local entity 20 to have a local copy of the behavior model that approximates or precisely corresponds to the behavior model 11 of the backend 10. For example, the updating 26 of the local behavior model 21 may comprise adopting the received behavior model 11 as the local behavior model 21 or may comprise, for example, eliminating a difference of the local behavior model 21 from the received behavior model 11. In other words: The local behavior model 21 may alternatively be adjusted such that it partially, largely, or entirely matches the received 25 behavior model 11.

The method 200 further comprises, as shown in FIG. 2, use 27 of the local behavior model 21 of the local entity 20 to provide the function 8 if particular backend information 9 is not available and/or the connection to the backend 20 is disrupted. Through the local behavior model 21 in the local entity 20, the same, similar, or approximately similar functionality can be ensured in the event of a connection disruption as if backend information 9 for the function 8 is available in the local entity 20. Alternatively, as shown in FIG. 2, backend information 9 provided by the backend 10 for the function 8 is used for the function 8.

The learning 23 of its local behavior model 21 by the local entity 20 may be based in some examples on features that are also available to the local entity 20 if particular backend information 9 is not available and/or a connection to the backend is disrupted. For example, a feature that is also available to the local entity 20 if there is no connection to the backend 10 or if a connection to the backend 10 is disrupted can be generated from data of a measuring system that is arranged within or at the local entity 20 and/or connected to it (e.g., in a vehicle). Additionally, or alternatively, a feature may be generated from data in a memory arranged within or at the local entity and/or connected thereto (e.g., in a vehicle). In some examples, a feature may be a time of day or day of the week. Due to the fact that the local behavior model 21 is learned or trained with features that are also available to the local entity 20 if there is no connection to the backend 10, it can be ensured that the local behavior model 21 can provide the function 8 if there is no connection to the backend 10.

In some examples, the reception 25 of a behavior model 11 from the backend 10 by the local entity 20 and updating 26 of the local behavior model 21 by the local entity 20 based on the behavior model 11 that is received from the backend 10 may occur at regular intervals and/or if particular events arise, optionally upon degradation of a connection between the backend 10 and the local entity 20. The reception 25 may in this case occur at regular intervals and/or if particular events arise, optionally upon degradation of a connection between the backend 10 and the local entity 20. Particular events may, for example, include the backend 10 and/or the local entity 20 entering a sleep state or, for example, the need for updating or maintenance of the backend 10 and/or of the local entity 20. Furthermore, any reasons for unavailability of the backend 10 and/or of the local entity 20 may be particular events. Alternatively, the local behavior model 21 may be received if a connection disruption is apparent, for example, due to a weakening or decrease in signal strength, or if it is known that the local entity 20 is approaching or already in a region of weaker network coverage, for example, or generally speaking, the local entity 20 may enter a state in which there is a risk of a connection disruption to the backend 10.

The method 200 may comprise, in some examples, reception 28 of a heartbeat message 31 from the backend 10 by the local entity 20 of the plurality of local entities, wherein the reception 28 of the heartbeat message 31 of the local entity 20 indicates that the establishment of a connection to the backend 10 is possible, and the resumption 29 of the reception of backend information 9 for the function 8. For example, a heartbeat message 31 may be broadcast from the backend 10 continuously, at regular or irregular intervals. The heartbeat message 31 can be a notification of the backend 10 to the plurality of the local entities 20 that the backend 10 is operational, or "alive" in colloquial terms. As shown in FIG. 2, if a heartbeat message 31 is received by the local entity 20, backend information 9 may again be used for the function 8. If a heartbeat message 31 of the backend 10 is not received by the local entity 20, the local entity 20 may assume that there is still or again a connection disruption to the backend 10, so that the local behavior model 21 continues to provide or again provides the function 8.

Furthermore, the method 100 can be combined with the method 200 to combine the interoperating method steps of the backend 10 with the method steps of the local entity 20.

In some examples, in the method 100 and/or the method 200, a degradation signal 30 may indicate whether there is a risk of a connection disruption from the local entity 20 to the backend 10. The degradation signal 30 is shown, by way of example, in FIG. 2. In one exemplary embodiment, the degradation signal 30 may control a switch 32 so that the local behavior model 21 provides the function 8 if there is a connection disruption or there is a risk of a connection disruption and/or no backend information 9 is available. In some examples, the switch may be embodied as a multiplexer, wherein a multiplexer may be a (semiconductor) selection circuit that, due to the degradation signal, optionally passes on the signal of the local entity 21 so that the local behavior model 21 provides the function 8. The selection circuit may in some examples be implemented as a software solution. For example, the degradation signal 30 may indicate whether there is a connection disruption and/or whether there is a risk of a connection disruption between the local entity 20 and the backend 10, due to the backend 10 and/or the local entity 20 entering a sleep state or, for example, the need for updating or maintenance of the backend 10 and/or of the local entity 20. Furthermore, due to all the reasons for unavailability of the backend 10 and/or of the local entity 20, a degradation signal 30 may indicate whether there is a connection disruption and/or whether there is a risk of a connection disruption between the local entity 20 and the backend 10. Alternatively, the degradation signal 30 may indicate whether there is a connection disruption and/or whether there is the risk of a connection disruption between the local entity 20 and the backend 10, if it is known that the local entity 20 is approaching or already in a region of weaker network coverage, for example, or generally speaking, the local entity 20 may enter a state in which there is a risk of a connection disruption to the backend 10. For example, based on the weakening of the signal strength of a connection between the local entity 20 and the backend 10, the degradation signal 30 may indicate whether there is a connection disruption and/or whether there is a risk of a connection disruption of the local entity 20 to the backend 10. For example, the degradation signal 30 may also indicate, based on additional information about local, time or technical circumstances, whether there is a connection disruption and/or whether there is a risk of a connection disruption between the local entity 20 and the backend 10. For example, based on the absence of data packets in the communication between the local entity 20 and the backend 10, the degradation signal 30 may indicate whether there is a connection disruption and/or whether there is a risk of a connection disruption of the local entity 20 to the backend 10. As shown in FIG. 2, in an exemplary implementation, the degradation signal 30 indicating whether there is a risk of a connection disruption may be reset if a heartbeat message 31 is received from the backend 10 so that backend information 9 may again be used for the function 8.

Figure 3:
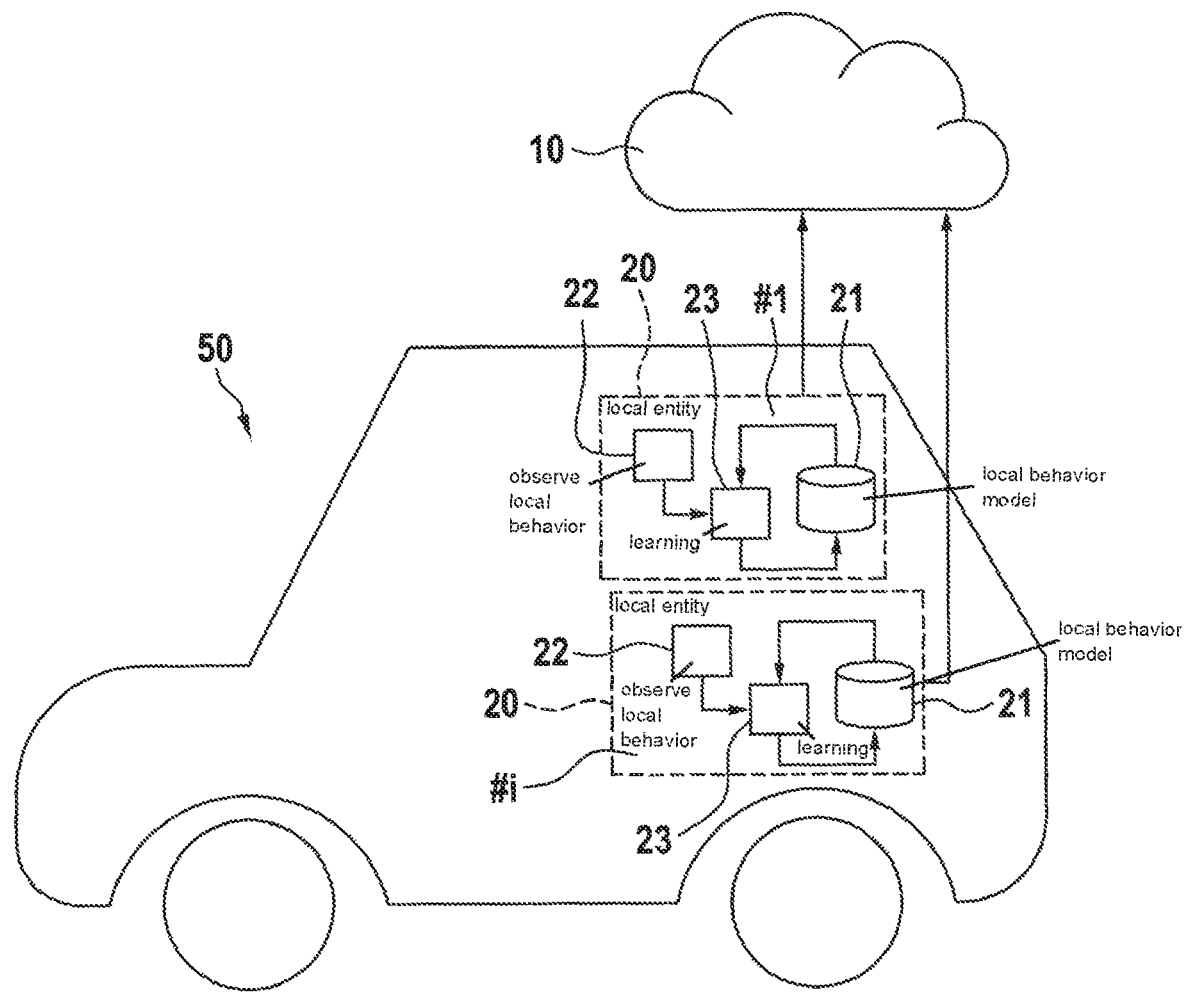
FIG. 3 illustrates an exemplary system for executing the computer-implemented method for maintaining a function in local entities upon connection disruption to a backend in a communication system using the example of a vehicle, according to an example embodiment of the present invention.

In some examples, in the method 100 and/or the method 200, the plurality of local entities 20 may be arranged as systems in a vehicle 50 and/or the function 8 may be used for autonomous and/or assisted driving. FIG. 3 illustrates an exemplary implementation of method 100 and method 200 in a vehicle 50. The local entities 20 are arranged as systems in this vehicle 50. One or more local entities 20 of the plurality of systems may be arranged in a vehicle 50. For example, $>=1$, $>=2$, $>=5$, $>=10$, $>=50$ or $>=100$, or i local entities 20 may be arranged as systems in the vehicle 50. Furthermore, the observation 22 of its local behavior as well as the learning 23 of its local behavior by the one or more local entities 20 of the plurality of local entities is shown. Furthermore, the transmission 24 of the local behavior model 21 to the backend 10 by the one or more local entities 20 is shown. Alternatively, several vehicles 50, in each of which a plurality of local entities 20 is arranged, may also be in one area. The local entities 20 arranged in the vehicles 50 can each transmit the local behavior models 21 thereof to the backend 10. The backend 10 may create a behavior model 11 based on the received behavior models 21 of the plurality of vehicles 50 in each of which a plurality of local entities is arranged.

In some examples, in the method 100 and/or the method 200, a local entity 20 of the plurality of local entities may be associated with a class from a plurality of classes, and the backend 10 may create a behavior model 11 for each class. Alternatively, for example, the backend 10 may also create a behavior model 11 for only a portion of the classes. For example, a class may be a particular device class here so that a behavior model 11 for a particular device class is created by the backend 10. This may ensure that a behavior model 11 is created for a local entity 20 of a class that comprises a particular function 8, and/or alternatively disregards a function 8 that does not occur in the local entity 20 of a particular class. Furthermore, for example, a class may also comprise a particular range of tasks with which a local entity 20 is associated.

A computer system designed to perform the computer-implemented method 100 and/or the computer-implemented method 200 for maintaining a function 8 in local entities 20 upon connection disruption to a backend 10 in a communication system is further disclosed. The computer system may comprise at least one processor and at least one working memory. The computer system may further comprise a (non-volatile) memory. Furthermore, one/each local entity 20 of the plurality of local entities may be a computer system. A/each local entity 20 may comprise at least one processor and/or one working memory. A/each local entity 20 may further comprise a (non-volatile) memory. Furthermore, the backend 10 may be a computer system. The backend 10 may comprise at least one processor and/or at least one working memory. The backend 10 may further comprise a (non-volatile) memory.

A computer program designed to perform the computer-implemented method 100 and/or the computer-implemented method 200 for maintaining a function 8 in local entities 20 upon connection disruption to a backend 10 in a communication system is further disclosed. The computer program may, for example, be present in interpretable or compiled form. For execution, it may be loaded (also in portions) into the RAM of a computer, for example, as a bit or byte sequence.

The computer program may comprise a plurality of portions, wherein at least one portion is executed on at least one local entity 20 of the plurality of local entities and another portion is executed on the backend 10.

A computer-readable medium or signal storing and/or containing the computer program or at least a portion thereof is further disclosed. The medium may, for example, comprise one of RAM, ROM, EPROM, HDD, SDD, . . . on/in which the signal is stored.

What is claimed is:

1. A computer-implemented method for maintaining a function in a plurality of local entities upon connection disruption to a backend in a communication system including the backend and the plurality of local entities, wherein the backend provides backend information for the function, the method comprising the following steps:
  receiving, by the backend, local behavior models from the plurality of the local entities, wherein the local behavior models in the local entities provide the function when particular backend information is not available;
  creating a behavior model based on the received local behavior models; and
  transmitting the behavior model to a local entity of the plurality of local entities by the backend, wherein the transmitting of the behavior model from the backend occurs when particular events arise including upon degradation of a connection between the backend and the local entity, wherein:
  a degradation signal is generated to indicate whether there is a risk of the connection disruption of the local entity to the backend, and
  the degradation signal controls a switch so that the local behavior model provides the function when the connection disruption is present or no backend information is available.

2. The computer-implemented method according to claim 1, wherein the transmitting of the behavior model to the local entity of the plurality of local entities by the backend occurs at regular intervals and/or when particular events arise including upon degradation of a connection between the backend and the local entity.

3. The computer-implemented method according to claim 1, wherein each local entity of the plurality of local entities is associated with a class from a plurality of classes, and the backend creates a behavior model for each class.

4. The computer-implemented method according to claim 1, wherein the switch is a multiplexer.

5. A computer-implemented method for maintaining a function in a plurality of local entities upon a connection disruption to a backend in a communication system including the backend and the plurality of local entities, wherein the backend provides backend information for the function, the method comprising the following steps:
  observing, by a local entity of the plurality of local entities, its local behavior;
  learning, by the local entity, its local behavior model;
  communicating, by the local entity, the local behavior model to the backend;
  receiving, by the local entity, a behavior model from the backend;
  updating, by the local entity, the local behavior model based on the behavior model received from the backend;
  using the local behavior model of the local entity to provide the function when particular backend information is not available, wherein the receiving of the behavior model from the backend by the local entity and the updating of the local behavior model by the local entity, using the behavior model received from the backend, occur when particular events arise including upon degradation of a connection between the backend and the local entity, wherein:
  a degradation signal is generated to indicate whether there is a risk of the connection disruption of the local entity to the backend, and
  the degradation signal controls a switch so that the local behavior model provides the function when the connection disruption is present or no backend information is available.

6. The computer-implemented method according to claim 5, wherein the learning, by the local entity, its local behavior model is based on features that are also available to the local entity when the particular backend information is not available and/or a connection to the backend is disrupted.

7. The computer-implemented method according to claim 5, further comprising:
receiving, by the local entity, a heartbeat message from the backend, wherein the receiving of the heartbeat message indicates that an establishment of a connection to the backend is possible; and
resuming reception of the backend information for the function.

8. The computer-implemented method according to claim 5, wherein the plurality of local entities are arranged as systems in a vehicle, and/or wherein the function is used for autonomous and/or assisted driving.

9. The computer-implemented method according to claim 5, wherein the backend information is vehicle information and/or environmental information.

10. A computer system configured to maintain a function upon connection disruption to a backend in a communication system, the communication system including the backend and a plurality of local entities, wherein the backend provides backend information for the function, the computer system configured to:
receive, by the backend, local behavior models from a plurality of the local entities, wherein the local behavior models in the local entities provide the function when particular backend information is not available;
create a behavior model based on the received local behavior models; and
transmit the behavior model to a local entity of the plurality of local entities by the backend, wherein the transmitting of the behavior model from the backend occurs when particular events arise including upon degradation of a connection between the backend and the local entity, wherein:
a degradation signal is generated to indicate whether there is a risk of the connection disruption of the local entity to the backend, and
the degradation signal controls a switch so that the local behavior model provides the function when the connection disruption is present or no backend information is available.

11. The computer system according to claim 10, wherein the switch is a multiplexer.

12. A non-transitory computer-readable medium on which is stored a computer program for maintaining a function in a plurality of local entities upon connection disruption to a backend in a communication system including the backend and the plurality of local entities, wherein the backend provides backend information for the function, the computer program, when executed by a computer, causing the computer to perform the following steps:
receiving, by the backend, local behavior models from a plurality of the local entities, wherein the local behavior models in the local entities provide the function when particular backend information is not available;
creating a behavior model based on the received local behavior models; and
transmitting the behavior model to a local entity of the plurality of local entities by the backend, wherein the transmitting of the behavior model from the backend occurs when particular events arise including upon degradation of a connection between the backend and the local entity, wherein:
a degradation signal is generated to indicate whether there is a risk of the connection disruption of the local entity to the backend, and
the degradation signal controls a switch so that the local behavior model provides the function when the connection disruption is present or no backend information is available.

13. The non-transitory computer-readable medium according to claim 12, wherein the switch is a multiplexer.

* * * * *